United States Patent [19]

Kotani et al.

[11] Patent Number: 4,786,156
[45] Date of Patent: Nov. 22, 1988

[54] REMOTE CONTROL SIDE MIRROR DEVICE FOR VEHICLE

[75] Inventors: Kunio Kotani, Isehara; Tatsuo Nakamura, Tokyo; Masagoro Kushida, Atsugi, all of Japan

[73] Assignee: Ichikoh Industries Limited, Tokyo, Japan

[21] Appl. No.: 776,970

[22] PCT Filed: Jan. 11, 1985

[86] PCT No.: PCT/JP85/00011

§ 371 Date: Sep. 9, 1985

§ 102(e) Date: Sep. 9, 1985

[30] Foreign Application Priority Data

Jan. 12, 1984 [JP] Japan ................... 59-2675

[51] Int. Cl.⁴ .................. G02B 7/18; G02B 5/08; B60R 1/06
[52] U.S. Cl. .................. 350/637; 350/604; 248/900; 248/478; 248/479
[58] Field of Search .......... 350/637, 604, 632; 248/476, 477, 478, 479, 900

[56] References Cited

U.S. PATENT DOCUMENTS

| | | | |
|---|---|---|---|
| 2,486,105 | 10/1949 | Bonar | 248/479 |
| 2,623,986 | 12/1952 | Falge | 248/479 |
| 3,005,384 | 10/1961 | Baird et al. | 350/637 |
| 3,132,201 | 5/1964 | Bertell et al. | 350/637 |
| 3,429,639 | 2/1969 | Peters | 350/637 |
| 3,433,511 | 3/1969 | Frankel | 248/477 |
| 3,610,736 | 10/1971 | Bateman | 350/637 |
| 3,830,561 | 8/1974 | LeFave et al. | 350/637 |
| 4,456,333 | 6/1984 | Hewitt | 350/637 |
| 4,626,083 | 12/1986 | Nakayama et al. | 350/604 |
| 4,626,084 | 12/1986 | Kumai | 350/604 |

FOREIGN PATENT DOCUMENTS

| | | |
|---|---|---|
| 2219787 | 12/1975 | Fed. Rep. of Germany . |
| 7503867 | 10/1976 | Fed. Rep. of Germany . |
| 55-136635 | 10/1980 | Japan . |
| 56-108328 | 8/1981 | Japan . |

Primary Examiner—Jon W. Henry
Attorney, Agent, or Firm—Foley & Lardner, Schwartz, Jeffery, Schwaab, Mack, Blumenthal & Evans

[57] ABSTRACT

A remote control side mirror device for a vehicle capable of rotating a mirror housing with respect to a mirror base fixed to an automotive body by a motor driven remote control. The motor driven by a remote control is fixed in the mirror housing to rotate a first gear through a reduction gear. A support shaft for rotatably supporting the mirror housing vertically is formed at the mirror base, and a second gear engaged in mesh with a first gear is arranged at the mirror housing side of the support shaft. Since the second gear is stationarily connected by the frictional force to the support shaft through a friction transmitting mechanism. When the motor is driven, the mirror housing is rotated around the support shaft of the mirror base. When the mirror housing receives a strong external force, the second gear can slide around the support shaft to prevent the reduction gear from damaging.

27 Claims, 4 Drawing Sheets

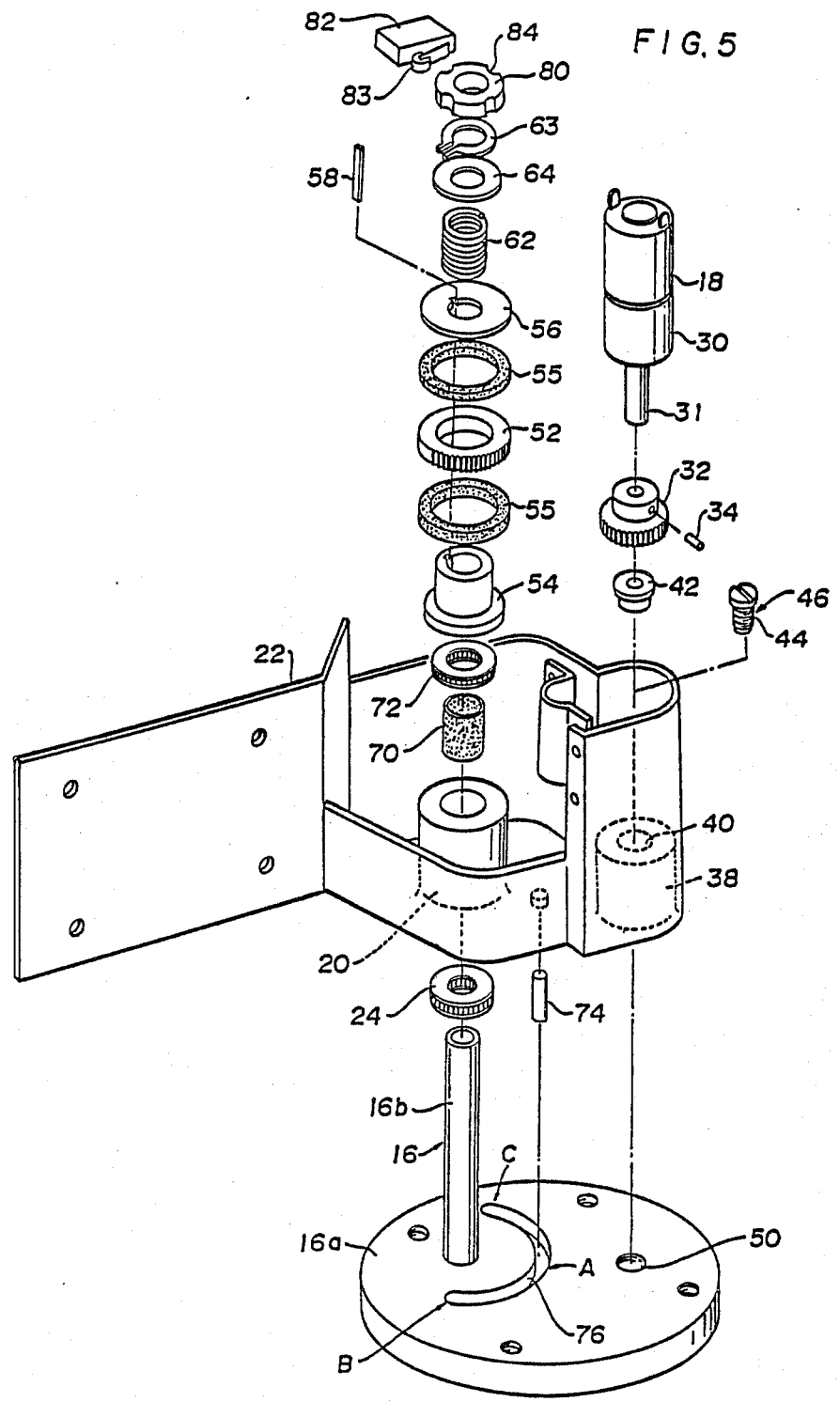

REMOTE CONTROL SIDE MIRROR DEVICE FOR VEHICLE

TECHNICAL FIELD

This invention relates to a remote control mirror used for a vehicle and, more particularly, to an outside mirror arranged at the upper portion of a door in the vicinity of a windshield for a vehicle.

BACKGROUND ART

Since an outside mirror for a vehicle is used in a sidewisely projected state of an automotive body, the mirror might contact or collide with an external obstacle when the vehicle is driven. In this case, the body of the mirror might damage. Further, when the mirror contacts a passer, the mirror might possibly hurt the passer. Therefore, an outside mirror in which the body of the mirror is tiltable to an automotive body, so-called a tiltable outside mirror has been recently developed. When a strong impact is applied to the body of the tiltable outside mirror, the mirror rotates at the body in a direction of the impact to moderate the impact.

However, since such a tiltable outside mirror for a vehicle has a structure that the mirror body is tilted after the impact is applied externally to the body of the side mirror, the mirror cannot sometimes avoid in advance the contact of the mirror body with an obstacle when the obstacle is discovered on a road ahead in the course of traveling during driving. When the vehicle is put into a garage, it is necessary to drive the vehicle at a slow speed while considering the widths of the mirror bodies projected from both sides of the automotive body. If the entering angle of the vehicle to the garage is not sufficient, the vehicle must be once stopped, the side mirror body must be then tilted, and the vehicle must be then put up in the garage, or the vehicle should be moved backward to establish a suitable entering angle, and the vehicle should be then put again into the garage. When a vehicle having outside mirrors of such type is shipped for an export, the widths of the outside mirrors projected from both sides of the automotive vehicle might reduct the number of vehicles to be shipped. Thus, the mirror bodies should be once tilted before the vehicle is located at a predetermined position in a ship, and the vehicle should be disposed at the predetermined position. In such a conventional tiltable outside mirror, a driver cannot tilt the side mirror bodies while sitting on a driver's seat in response to the outer environment during driving, and if it is necessary to tilt the mirrors, the driver must be once left from the vehicle, and the driver should manually tilt the mirrors, thereby resulting in an unpreferable safety driving and a complicated work.

An object of this invention is to provide a remote control outside mirror device in which a driver can rotate a side mirror body to a desired position with respect to an automotive body in response to an external environment while sitting on a driver's seat.

Another object of this invention is to provide a remote control outside mirror device for a vehicle in which a side mirror body is tilted or rotated in a direction that an impact is applied to the mirror body with respect to an automotive body when a predetermined or larger impact is applied to the mirror body to moderate the impact and the mirror body can be thereafter returned to the original position of using state under a remote control.

Still another object of the invention will become more fully apparent by the following detailed description when read in conjunction with the accompanying drawings.

DISCLOSURE OF INVENTION

A remote control outside mirror device for a vehicle of this invention comprises a mirror housing for rotatably supporting a mirror, a mirror base having a support shaft fixedly secured to an automotive body for supporting the mirror housing rotatably substantially in a traveling direction of the vehicle, drive means fixedly secured to the mirror housing for rotating the mirror housing under a remote control at the support shaft as a center, a reduction gear mechanism connected to the drive means, first gear means connected to the reduction gear mechanism, second gear means held coaxially with the support shaft and engaged in mesh with the first gear means, and a friction transmitting means interposed between the support shaft and the second gear means, the friction transmitting means normally stationarily connecting the second gear means to the support shaft by a frictional force so that the stationary connection is released when receiving a predetermined or larger external force. Thus, when a driver judges to need to rotate the mirror body with respect to the automotive body during driving, the driver drives the drive means under a remote control, thereby rotating the first gear means. Since the first gear means is engaged in mesh with the second gear means connected stationarily to the mirror base, the first gear means relatively rotates with respect to the second gear means. More particularly, the mirror housing is rotated around the support shaft of the mirror base to stop the drive means at a predetermined position, thereby holding the mirror housing at an adequate angular position.

Further, since the remote control mirror device for the vehicle is so constructed that, when receiving a predetermined or larger external force, the friction transmitting means is constructed to release the stationary connection by the frictional force between the support shaft of the mirror base and the second gear means, the second gear means rotates in a rotating direction of the support shaft in the state engaged with the first gear means, i.e., the friction transmitting means does not allow unreasonable load to be applied to the reduction gear mechanism and the drive means by overcoming the frictional force. The mirror housing rotated or tilted by the external force can be advantageously returned to the original using position under a remote control.

BRIEF DESCRIPTION OF THE DRAWINGS

FIG. 5 is an enlarged exploded perspective view of the essential portion of the invention.

BEST MODE OF CARRYING OUT THE INVENTION

Figure 1:
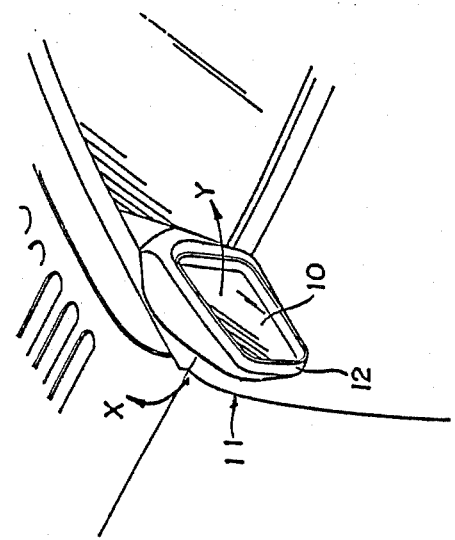
FIG. 1 is a schematic perspective view showing the state that a remote control side mirror device of this invention is mounted at an automotive body.
Figure 2:
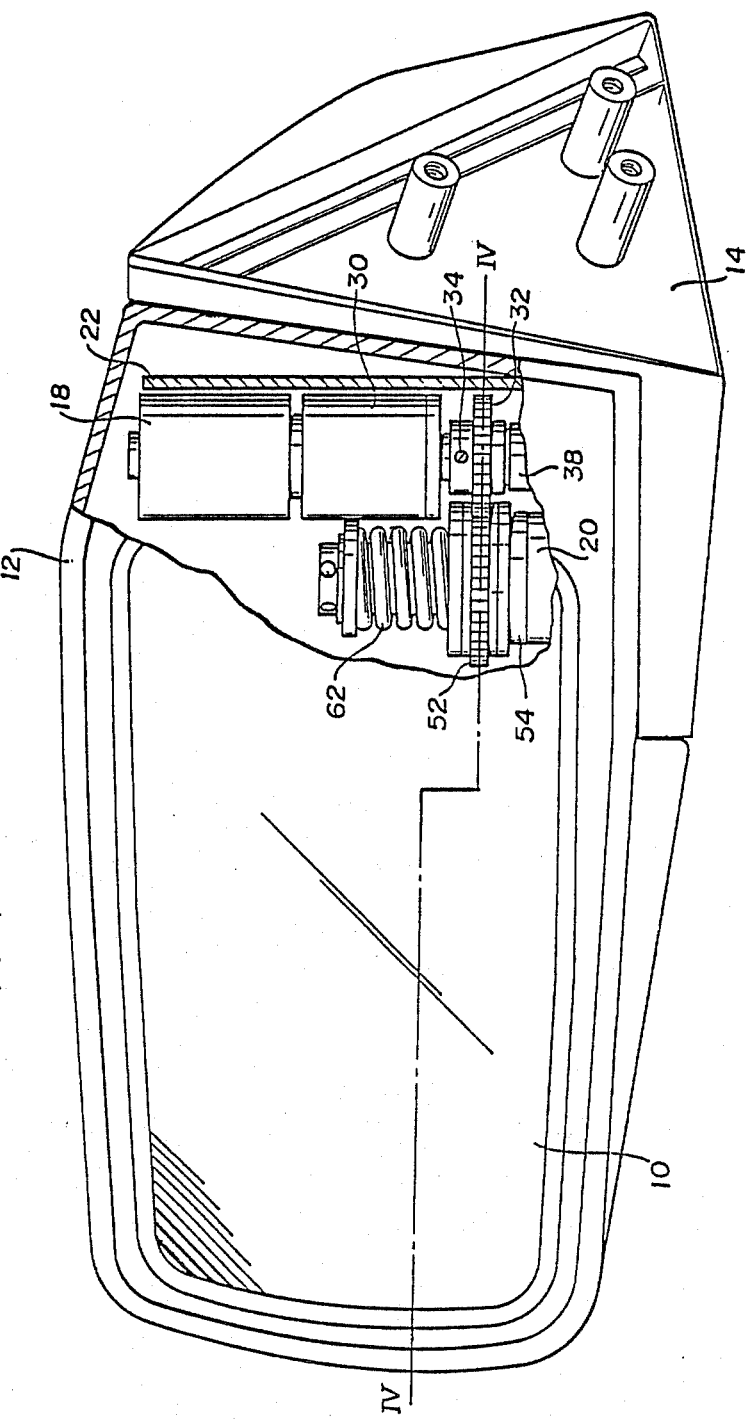
FIG. 2 is a front view of the remote control side mirror device of this invention partly shown fragmentarily.
Figure 4:
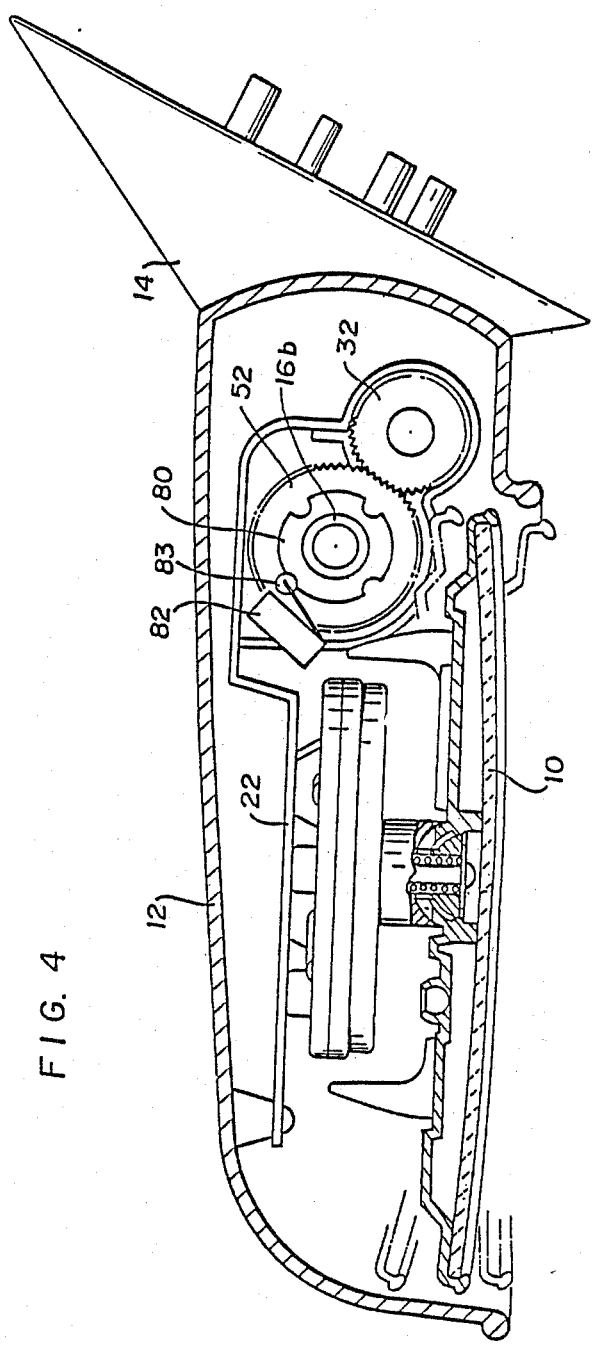
FIG. 4 is a sectional view, taken along the line IV—IV of FIG. 2.

A remote control side mirror device according to the present invention is arranged to be projected sidewisely from an automotive body 11 as shown in FIG. 1, and has a mirror housing 12 for rotatably supporting a mirror 10, and a mirror base 14 fixedly secured to the body 11 for supporting the housing 12. The mirror housing 12 is adapted to rotate or tilt around a shaft 16 fixedly secured to the mirror base 14 under a remote control. This remote control device is not shown in the drawings, but has a control circuit for driving a drive motor 18 for rotating the housing 12 by the switching operation of a changeover switch (not shown) provided, for example, on a dashboard in a compartment under a remote control to rotate the housing 12 in a direction of an arrow X or Y.

The mirror base 14 for supporting the mirror housing 12 is fixedly secured to the upper portion of a door adjacent to a windshield of a vehicle. A shaft 16 fixedly secured to the base 14 has a mounting unit 16a to the base 14 and a support shaft 16b extending perpendicularly from the unit 16a.

The mirror housing 12 has an inner casing 22 formed with a cylindrical bearing 20 having an inner diameter slightly larger than the outer diameter of the support shaft 16b. The bearing 20 of the casing 22 is arranged coaxially with the support shaft 16b, engaged with the shaft 16b, and supported rotatably to the mirror base 14 through a thrust bearing 24 at the bottom. The motor 18 for rotating the housing 12 is fixedly secured to the casing 22, and the output shaft is arranged as a unit in the state connected to a reduction gear unit 30. The gear unit 30 is constructed in a small size and a light weight with a known single gear reduction gear such as, for example, with a bevel gear. A drive spur gear 32 is clamped with a screw 34 to the output shaft 31 of the reduction gear 30. The end of the shaft 31 is inserted through the gear 32 into a hole 40 of the cylindrical portion 38 formed at the casing 22 through a bush 42.

The hole 40 of the cylindrical portion 38 is formed in a penetrating shape, and female threaded portion 42 is formed on the inner wall of the lower portion. A threaded member 46 having a male threaded portion 44 to be engaged with the female threaded portion 42 is disposed in the hole 40. The inside of the threaded member 46 is formed in a hollow shape, and a compression coiled spring 48 is contained in the hollow portion.

Figure 3:
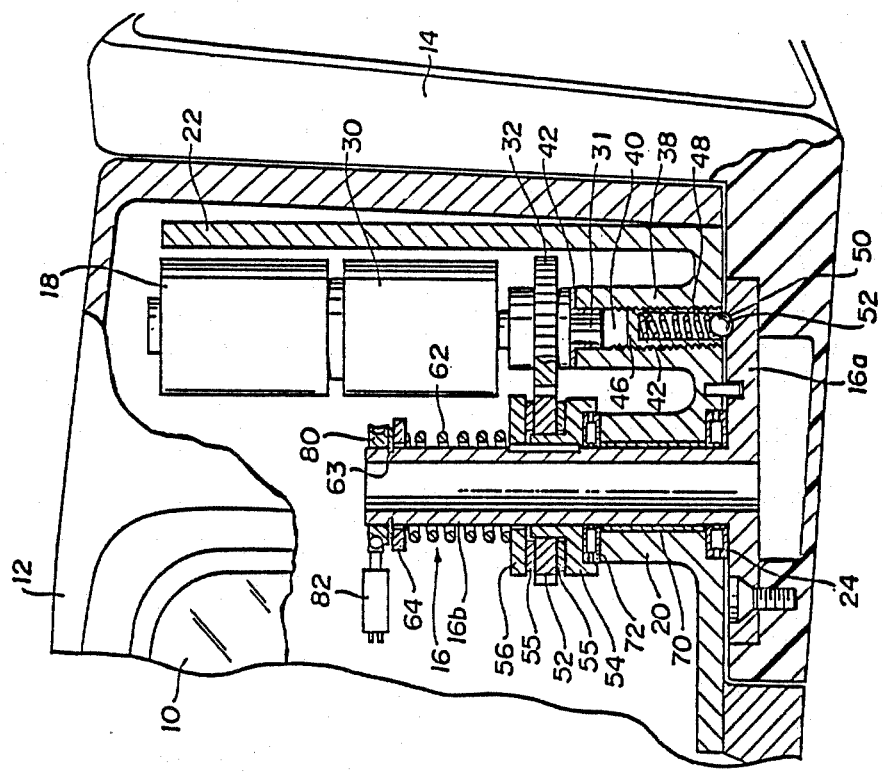
FIG. 3 is a partial fragmentarily enlarged sectional view showing an essential portion of the invention.

As shown in FIG. 3, a groove 50 is formed on the mounting unit 16a of the mirror base 14 corresponding to the angular position disposed with respect to the mirror base 14 when the mirror housing 12 is normally used. A ball 52 which is slightly larger in diameter than the groove 50 is partly disposed at the position in the groove 50, and the coiled spring 48 presses the ball 52 to the inner wall of the groove 50.

A ball plunger is composed of the threaded member 46, the coiled spring 48 and the ball 52 described above, and the mirror housing 12 is elastically engaged with the mirror base 14 at the normally using time. The elastic engagement by the ball plunger in this manner is necessarily selected in the strength so as not to disturb the rotation of the housing 12 by the drive of the motor 18.

The spur gear 52 is arranged coaxially with the support shaft 16b to be engaged with the gear 32 secured to the output shaft 31 of the reduction gear 30. The gear 52 is interposed between a bearing plate 54 fixedly secured by a key 58 to the support shaft 16b and a pressure plate 56 arranged at the position opposed to the plate 54, and liners 55 and 55 are respectively arranged between the gear 52 and the plate 54, and between the gear 52 and the plate 56. The pressure plate 56 is limited by the key 58 in the displacement of the shaft 16b in the direction around the shaft, but one end of a compression coiled spring 62 is contacted with the upper surface, thereby bearing the tension of the spring perpendicularly downward. The upper end of the spring 62 is contacted with a spring retainer 64 limited in the displacement perpendicularly upward by a stopping ring 63 fixedly secured to the upper portion of the shaft 16a.

Therefore, the spur gear 52 is interposed between the bearing plate 54 and the pressure plate 56 by the tension of the coiled spring 62 in the state that the liners 55 and 55 are contacted with the upper and lower surfaces thereof. In the embodiment described above, the liners 55, 55 are formed of a material having large frictional resistance, and constructed so that a large stationary frictional force exists between the liners and the gear 52 in the state pressed by the coiled spring 62. However, the spur gear 52 may be formed integrally with a material having a large frictional resistance on the opposed surfaces of the bearing plate 54 and the pressure plate 56, or may be formed with irregular surfaces machined on the surfaces themselves. When thus constructed, the gear 52 may be normally connected stationarily to the support shaft 16b. Therefore, when the motor 18 is driven under a remote control, the spur gear 32 is rotated through the reduction gear 30, but the spur gear 52 engaged with the gear 32 is fixedly secured to the support shaft 16b of the mirror base 14. Thus, the gear 32 moves around the gear 52 while rotating around its own axis, i.e., rotates around its own axis. Thus, the mirror housing 12 rotates with respect to the mirror base 14.

On the other hand, when the mirror housing 12 receives an external force to forcibly rotate itself, the force is transmitted through the casing 22 and the spur gear 32 to the spur gear 52. When this external force is larger than the maximum stationary frictional force between the gear 52 and the liners 55, 55 as described above, the gear 52 starts rotating around the support shaft 16b. In other words, the stationary connection to the support shaft 16b of the gear 52 is released. Since the external force is thus transmitted as a force for rotating the gear 52 around the support shaft, the reduction gear 30 does not result in a damage.

In the remote control side mirror device according to this invention, in order that the rotation of the mirror housing 12 to the mirror base 14 is smooth, the above-described thrust bearing 24 is arranged, but a bush 70 for reducing the frictional resistance between the inner surface of the bearing 20 formed on the casing 22 and the outer periphery of the support shaft 16b is arranged therebetween in addition to the bearing 24, and another thrust bearing 72 is arranged between the top of the bearing 20 and the bearing plate 54.

A guide member 74 projected in front of the mounting unit 16a of the mirror base 14 is further arranged on the inner casing 22 mounted in the mirror housing 12, and a guide passage 76 for sliding the guide member 74 is formed at the unit 16a. This passage 76 is limited to the range that the zone for rotating the mirror housing 12 formed substantially in a semispherical shape at the shaft 16b as a center forms an angle of substantially 180° as shown in FIG. 5. The positions A, B and C of the passage 76 designate the angular positions to the mirror base 14 of the housing 12 in such a manner that the position A corresponds to the position that the housing 12 is normally used, the positions B and C correspond to the positions that the housing 12 is tilted in the traveling direction of the vehicle and in the direction reverse to the traveling direction. The angular position of the housing 12 to the mirror base 14 is detected by a grooved disc 80 fixedly secured to the top of the shaft 16b and a microswitch 82 fixedly secured onto the casing 22. Grooves 84 corresponding to the positions A and B of the guide passage 76 are respectively formed on the periphery of the disc 80, and when the housing 12 is rotated, the movable contact 83 of the microswitch 82 slides on the periphery of the disc 80. When the contact 80 is disposed in any of the grooves corresponding to the positions A, B and C, the microswitch 82 is closed. When the microswitch 82 is closed, a control circuit (not shown) for driving the motor 18 becomes operable by the switching of an operation switch for switching the rotating direction of the motor 18. For example, when the housing 12 is in a normal using state A, the housing 12 is rotated to the position B or C by switching the operation switch to positive or negative direction, and the motor 18 is stopped thereat.

In the state that the housing 12 receives by a strong external force to tilt from the position A to the position B or C, the microswitch 82 is closed, and the above-described control circuit is constructed so that, when the operation switch is changed to negative or positive direction in this state, the housing 12 is rotated to the position A and stopped rotating thereat.

In the embodiment of this invention as described above, the motor 18 and the reduction gear 30 are constructed in an integral unit coupled in a series connection thereof. However, the motor 18 and the reduction gear 30 may be arranged in parallel to mechanically connect both so that the rotation of the motor 18 is transmitted to the reduction gear 30. Thus, the vertical height of the housing 12 may be reduced, thereby compactly constructing the entire mirror device.

We claim:

1. A remote control side mirror device for a vehicle comprising a mirror housing for rotatably supporting a mirror, a mirror base having a support shaft, said mirror base adapted to be fixedly secured to an automotive body for supporting said mirror housing rotatably substantially in a traveling direction of the vehicle, drive means fixedly secured to said mirror housing for rotating said mirror housing under remote control at the support shaft as a center, a reduction gear mechanism connected to said drive means, first gear means connected to said reduction gear mechanism and having an axis of rotation, second gear means held coaxially with the support shaft and engaged in mesh with said first gear means, first means for releasably engaging said support shaft with said second gear means so that the engagement is released when receiving a predetermined or larger external force to vary the relative angular position to the support shaft of said second gear means and second means for releasably engaging said housing with said base at a location on said axis of rotation.

2. The device as claimed in claim 1 wherein said first releasably engaging means includes friction transmitting means interposed between said support shaft and said second gear means, said frictional transmitting means comprising a first frictional plate member fixedly secured coaxially to the support shaft, a second frictional plate member disposed oppositely to said first frictional plate member, and elastic means for imparting an elastic force to said second frictional plate member, said second gear means being interposed between said first and said second frictional plate means, and limited in the relative displacement in the direction around the support shaft to the support shaft by being pressed by said elastic means.

3. The device as claimed in claim 2 wherein said first and second frictional plate members respectively comprise linings on the surfaces of the side oppositely to said second gear means.

4. The device as claimed in claim 2 wherein said elastic means is disposed coaxially with the support shaft, and includes a coiled spring, one end of said elastic means being axially fixed relative to the support shaft, the other end of said elastic means contacted with said second frictional plate member.

5. The device as claimed in claim 1 wherein said mirror housing is supported to said mirror base through at least one thrust bearing coaxial with said support shaft.

6. The device as claimed in claim 1 wherein said second releasably engaging means comprises a compression coiled spring axially fixed at one end thereof to any of said mirror housing and said mirror base, and a ball member opposed to said coiled spring, disposed partially in a groove formed in any of said mirror housing and said mirror base, said ball member pressed by said spring.

7. The device as claimed in claim 1 wherein a guide member moving along the rotating range of said mirror housing is arranged between said mirror housing and said mirror base.

8. The device as claimed in claim 2, wherein said mirror housing is supported to said mirror base through at least one thrust bearing coaxial with said support shaft.

9. The device as claimed in claim 4, wherein said mirror housing is supported to said mirror base through at least one thrust bearing coaxial with said support shaft.

10. The device a claimed in claim 2, wherein a guide member moving along the rotating range of said mirror housing is arranged between said mirror housing and said mirror base.

11. The device as claimed in claim 4, wherein a guide member moving along the rotating range of said mirror housing is arranged between said mirror housing and said mirror base.

12. The device as claimed in claim 5, wherein a guide member moving along the rotating range of said mirror housing is arranged between said mirror housing and said mirror base.

13. The device as claimed in claim 8 wherein one of said thrust bearings is interposed between said first frictional plate member and said mirror housing.

14. The device as claimed in claim 6, wherein a guide member moving along the rotating range of said mirror housing is arranged between said mirror housing and said mirror base.

15. The device as claimed in claim 13, wherein a guide member moving along the rotating range of said mirror housing is arranged between said mirror housing and said mirror base.

16. A remote control side mirror device for a vehicle comprising a mirror housing rotatably supporting a mirror, a mirror base having a support shaft, said mirror base adapted to be fixedly secured to an automotive body for supporting said mirror housing rotatably substantially in a traveling direction of the vehicle, drive means fixedly secured to said mirror housing for rotating said mirror housing under a remote control at the support shaft as a center, a reduction gear mechanism connected to said drive means, first gear means connected to said reduction gear mechanism, second gear means held coaxially with the support shaft and engaged in mesh with said first gear means, first means for releasably engaging said support shaft with said second gear means so that the engagement is released when receiving a predetermined or larger external force to vary the relative angular position to the support shaft of said second gear means and seCond means for releasably engaging said housing with said base at a first relative position, said second releasably engaging means releasing when said drive means rotates said mirror housing from said first relative position.

17. The device as claimed in claim 16 wherein said mirror base is rigid so that when said mirror base is attached to a vehicle it supports said support shaft in fixed relation to the vehicle.

18. The device as claimed in claim 16, further comprising means for automatically interrupting said drive means and means for limiting rotation of said mirror housing between second and third positions relative to said mirror base, said interrupting means including means for interrupting said drive means as said drive means moves said mirror housing adjacent any of said first, second and third relative positions.

19. The device as claimed in claim 18, wherein said limiting means includes a recess one of said mirror housing and said mirror base and a member affixed to the other of said mirror housing and said mirror base, said member received in said recess.

20. The device as claimed in claim 18 wherein said first releasably engaging means includes friction transmitting means interposed between said support shaft and said second gear means, said frictional transmitting means comprising a first frictional plate member fixedly secured coaxially to the support shaft, a second frictional plate member disposed oppositely to said first frictional plate member, and elastic means for imparting an elastic force to said second frictional plate member, said second gear means being interposed between said first and said second frictional plate means, and limited in the relative displacement in the direction around the support shaft to the support shaft by being pressed by said elastic means.

21. The device as claimed in claim 20 wherein said first and second frictional plate members respectively comprise linings on the surfaces of the side oppositely to said second gear means.

22. The device as claimed in claim 20 wherein said elastic means is disposed coaxially with the support shaft, and includes a coiled spring, one end of said elastic means being axially fixed relative to the support shaft, the other end of said elastic means contacted with said second frictional plate member.

23. The device as claimed in claim 20 wherein said mirror housing is supported to said mirror base through at least one thrust bearing coaxial with said support shaft.

24. The device as claimed in claim 23 wherein one of said thrust bearings is interposed between said first frictional plate member and said mirror housing.

25. The device as claimed in claim 20 wherein said second releasably engaging means comprises a compression coiled spring axially fixed at one end thereof to any of said mirror housing and said mirror base, and a ball member opposed to said coiled spring, disposed partially in a groove formed in any of said mirror housing and said mirror base, said ball member pressed by said spring.

26. A remote control side mirror device for a vehicle comprising a mirror, a mirror housing provided with means for rotatably supporting said mirror so that said mirror may be adjusted in position relative to said mirror housing, a mirror base having a support shaft rotatably supporting said mirror housing, said base adapted to be fixed to a vehicle so that said housing is rotatable substantailly in a traveling direction of the vehicle and about an axis fixed relative to the vehicle, drive means fixedly secured to said mirror housing for rotating said mirror housing under a remote control at the support shaft as a center, a reduction gear mechanism connected to said drive means, first gear means connected to said reduction gear mechanism, second gear means held coaxially with the support shaft and engaged in mesh with said first gear means, first means for releasably engaging said support shaft with said second gear means so that the engagement is released when receiving a predetermined or larger external force to vary the relative angular position to the support shaft of said second gear and second means for releasably engaging said housing with said base at a first relative position.

27. The remote control side mirror as claimed in claim 26 further comprising means for automatically interrupting said drive means as said mirror housing arrives at said first relative position.

* * * * *